(12) United States Patent
Schott et al.

(10) Patent No.: US 7,349,462 B2
(45) Date of Patent: Mar. 25, 2008

(54) ACQUISITION AND ADJUSTMENT OF GAIN, RECEIVER CLOCK FREQUENCY, AND SYMBOL TIMING IN AN OFDM RADIO RECEIVER

(75) Inventors: Wolfgang Schott, Rueschlikon (CH); Pedro E. Coronel, Thalwil (CH); Simeon Furrer, Adliswil (CH); Jens Jelitto, Rueschlikon (CH); Beat Weiss, Edlibach (CH); Dietrich Maiwald, Waedenswil (CH)

(73) Assignee: International Business Machines Corporation, Armonk, NY (US)

( * ) Notice: Subject to any disclaimer, the term of this patent is extended or adjusted under 35 U.S.C. 154(b) by 815 days.

(21) Appl. No.: 10/738,693

(22) Filed: Dec. 17, 2003

(65) Prior Publication Data
US 2004/0161046 A1 Aug. 19, 2004

(30) Foreign Application Priority Data
Dec. 23, 2002 (EP) .................. 02406131

(51) Int. Cl.
*H04B 1/69* (2006.01)
(52) U.S. Cl. .................................... 375/147
(58) Field of Classification Search ............ 455/71, 455/136, 138, 182.1, 192.1, 230, 231, 232.1, 455/239, 240.1, 245, 247.1; 375/147, 345, 375/344
See application file for complete search history.

(56) References Cited

U.S. PATENT DOCUMENTS

| 6,621,857 | B1 * | 9/2003 | Belotserkovsky et al. | .. 375/149 |
|---|---|---|---|---|
| 2002/0154620 | A1 * | 10/2002 | Azenkot et al. | ............ 370/347 |
| 2002/0154688 | A1 * | 10/2002 | Pollmann et al. | ........... 375/229 |
| 2003/0031275 | A1 * | 2/2003 | Min et al. | .................... 375/326 |
| 2003/0058952 | A1 * | 3/2003 | Webster et al. | ............. 375/260 |
| 2004/0246891 | A1 * | 12/2004 | Kay et al. | .................... 370/215 |

\* cited by examiner

*Primary Examiner*—Khai Tran
(74) *Attorney, Agent, or Firm*—F.Chau & Associates, LLC

(57) ABSTRACT

The present invention discloses a method and apparatus for adjusting gain setting, receiver clock frequency, and symbol timing in an OFDM radio receiver. The method is based on the reception of a preamble with known periodic training sequences transmitted prior to user data over the radio channel. By computing a periodicity metric, an inner receiver detects the presence of periodic signals in the received data sequence, provides means to set the Variable Gain Amplifier VGA gain in the radio frontend, and estimates frequency offsets between the transmit and receive clock. Matched filters are used to determine the symbol timing. A finite-state-machine schedules various tasks during the receiver startup.

20 Claims, 4 Drawing Sheets

US 7,349,462 B2

ACQUISITION AND ADJUSTMENT OF GAIN, RECEIVER CLOCK FREQUENCY, AND SYMBOL TIMING IN AN OFDM RADIO RECEIVER

TECHNICAL FIELD

The present invention is related to a method and apparatus for acquiring and adjusting gain, receiver clock frequency, and symbol timing in an OFDM radio receiver.

BACKGROUND OF THE INVENTION

Orthogonal Frequency Division Multiplexing, also abbreviated to OFDM, will be the modulation technique of choice for future broadband wireless communication systems. In OFDM based systems, a user data stream is split into parallel streams of reduced rate. Each substream then modulates a separate subcarrier. By appropriately choosing a frequency spacing between subcarriers, the carriers are made orthogonal and some spectral overlap between the subchannels is permitted, leading to a better spectral efficiency than using simple frequency division. OFDM is especially attractive for high-speed wireless communication systems because it is robust against multi-path fading, intersymbol interference, and against narrowband interference. This promising modulation technique has already been accepted as physical layer for the Wireless Local Area Network (WLAN) standards IEEE 802.11a and ETSI Hiperlan-2. Both WLANs are operated in a 20 MHz wide radio channel in the 5 GHz frequency band, and provide user-selectable data rates between 6 and 54 Mb/s.

Before a user data packet consisting of several fixed length OFDM symbols can be exchanged over a radio channel, an OFDM receiver has to be adjusted so that it can successfully reconstruct the transmitted packet from the noisy, distorted signal received at an antenna. For this purpose, a preamble with known training symbols is transmitted prior to the user data packet over the radio channel. The preamble should allow the receiver to estimate a correct gain setting of a Variable Gain Amplifier (VGA) in the radio frontend, the frequency offset between the transmit and receive clock, and the OFDM symbol timing.

U.S. Pat. No. 5,732,113 is related to timing and frequency synchronization of OFDM signals. A method and apparatus for rapid timing synchronization, carrier frequency synchronization, and sampling rate synchronization of a receiver to an orthogonal frequency division multiplexed (OFDM) signal is disclosed. The method uses two OFDM training symbols to obtain synchronization. A first OFDM training symbol has only even-numbered sub-carriers, and substantially no odd-numbered sub-carriers, an arrangement that results in half-symbol symmetry. A second OFDM training symbol has even-numbered sub-carriers differentially modulated relative to those of the first OFDM training symbol by a predetermined sequence. Synchronization is achieved by computing metrics which utilize the unique properties of these two OFDM training symbols. Timing synchronization is determined by computing a timing metric which recognizes the half-symbol symmetry of the first OFDM training symbol. Carrier frequency offset estimation is performed in using the timing metric as well as a carrier frequency offset metric which peaks at the correct value of carrier frequency offset. Sampling rate offset estimation is performed by evaluating the slope of the locus of points of phase rotation due to sampling rate offset as a function of sub-carrier frequency number. However, the patent specification does not define a suitable gain control scheme and thorough receiver start-up for an IEEE 802.11a or ETSI Hiperlan-2 standard.

From the above it follows that there is still a need in the art for an improved method for adjusting of gain, frequency, and symbol timing in OFDM receivers. The adjustment of gain setting, receiver clock frequency, and symbol timing shall be achieved as quickly as possible in order to allow timely and reliable reception of user data.

SUMMARY OF THE INVENTION

Disclosed is a mechanism for the acquisition and adjustment of gain, receiver clock frequency, and symbol timing in OFDM radio receivers. The mechanism is based on the reception of a preamble with known periodic training sequences transmitted prior to user data over a radio channel. By computing a periodicity metric, an inner OFDM receiver detects the presence of periodic signals in the received data sequence, provides means to set the Variable Gain Amplifier (VGA) gain in a radio frontend, and estimates frequency offsets between the transmit and receive clock. Matched filters are used to determine the symbol timing. The inner receiver finite-state-machine (FSM) schedules various tasks during receiver startup. Even though the disclosure relates to 802.11a WLAN physical layer standard, it can also be applied to other OFDM based radio transceivers. The method can also be applied to physical layer implementations of the ETSI Hiperlan-2 WLAN standard.

In accordance with the present invention, there is provided a method for adjusting gain setting, receiver clock frequency, and symbol timing in an OFDM radio receiver. The method comprises the steps of receiving a symbol sequence $\{x_n\}$ of data samples $x_n$, the symbol sequence $\{x_n\}$ comprising a preamble and user data, and the preamble comprising a first signal with a first periodicity $P_1$ based on a repetitive transmission of a first training symbol and a second signal with a second periodicity $P_2$ based on a repetitive transmission of a second training symbol; storing the data samples $x_n$ in a register; deriving a signal energy estimate $E_n$ from the stored data samples $x_n$ for correcting the gain setting; deriving a first periodicity metric $m_n^{P_1}$ and a second periodicity metric $m_n^{P_2}$ from the stored data samples $x_n$ for detecting the presence of the first signal with the first periodicity $P_1$ and the presence of the second signal with the second periodicity $P_2$; deriving a first phase rotation $\phi_n^{P_1}$ between the stored data samples $x_n$ of the first signal spaced one first period $P_1$ apart and a second phase rotation $\phi_n^{P_2}$ between the received data samples $x_n$ of the second signal spaced one second period $P_2$ apart for determining the frequency offset between transmit and receive clock; detecting the reception of first training symbols, second training symbols, and the end of the second signal with the second periodicity $P_2$ by using correlators; and responsive to the derivations and detections, adjusting the gain setting, receiver clock frequency, and symbol timing under use of a finite-state-machine. The correlators can be implemented as matched filters.

In accordance with another aspect of the present invention, there is provided an apparatus for adjusting gain setting, receiver clock frequency, and symbol timing. The apparatus comprises receiving means for receiving a symbol sequence $\{x_n\}$ of data samples $x_n$; a register for storing the data samples $x_n$, the register having a size to store at least data samples $x_n$ of a first signal with a first periodicity $P_1$ and a second signal with a second periodicity $P_2$; a computational unit for computing periodicity metrics $m_n^{P_1}$, $m_n^{P_2}$ and matched filter output signals $mf_n^{P_1}$, $mf_n^{P_2}$ from the stored data samples $x_n$; and a finite-state-machine which in response to the output of the computational unit controls the adjustment of the gain setting, the receiver clock frequency, and the symbol timing.

The dependent claims cover embodiments of the resent invention.

DESCRIPTION OF THE DRAWINGS

Preferred embodiments of the invention are described in detail below, by way of example only, with reference to the following schematic drawings.

The drawings are provided for illustrative purposes only.

DETAILED DESCRIPTION OF EMBODIMENTS

Before embodiments of the present invention are described in detail with reference to the FIGS. 2 to 5, some basic issues are addressed with reference to FIG. 1.

Figure 1:
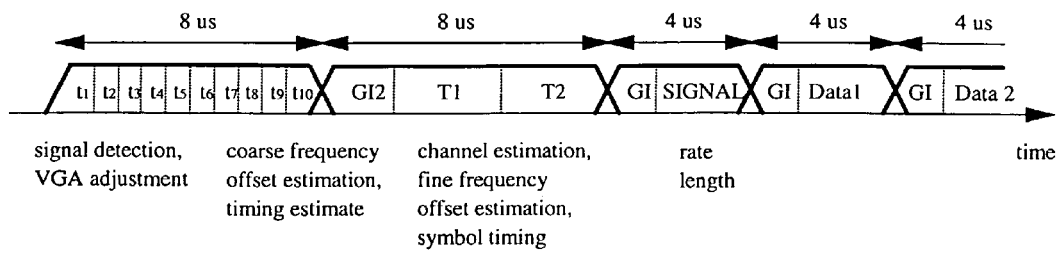
FIG. 1 shows a schematic illustration of a sequence of transmitted training and data symbols as defined in the 802.11a WLAN standard.

FIG. 1 shows a sequence of transmitted training and OFDM data symbols as defined in the 802.11a WLAN standard and below appropriate actions to be taken. The preamble consists of two 8 μs long frames. In the first frame, a short training symbol, also referred to as first training symbol, of duration 0.8 μs is repeatedly transmitted 10 times. It is generated by using only 12 out of the 52 subcarriers used for an OFDM data symbol. This training sequence can be used for signal detection, VGA gain adjustment, and for acquiring an initial, coarse estimate of the frequency offset value as indicated below the shown frame. Fine-tuning of the frequency offset estimate and symbol timing adjustment can be performed while receiving a second frame of the preamble that consists of a 1.6 μs long Guard Interval (GI2) and two 3.2 μs long training symbols T1, T2, each herein also referred to as second training symbol, which are generated by using all 52 subcarriers. After the preamble, 4 μs long OFDM data symbols are transmitted which carry first a SIGNAL field and then user data. The SIGNAL field indicates to the receiver the packet length of the user data packet and the data rate to be used for the transfer of the data packet over the radio link as indicated below the shown frame. Each of the OFDM data symbols always comprises a short Guard Interval (GI) of 0.8 μs in which a cyclic extension of the data symbol is transmitted to eliminate intersymbol interference caused by multi-path propagation with a delay spread less than 0.8 μs. While receiving OFDM data symbols, small frequency offsets left after processing the preamble can be tracked with a control loop by monitoring known pilots transmitted on four subcarriers.

Figure 2:
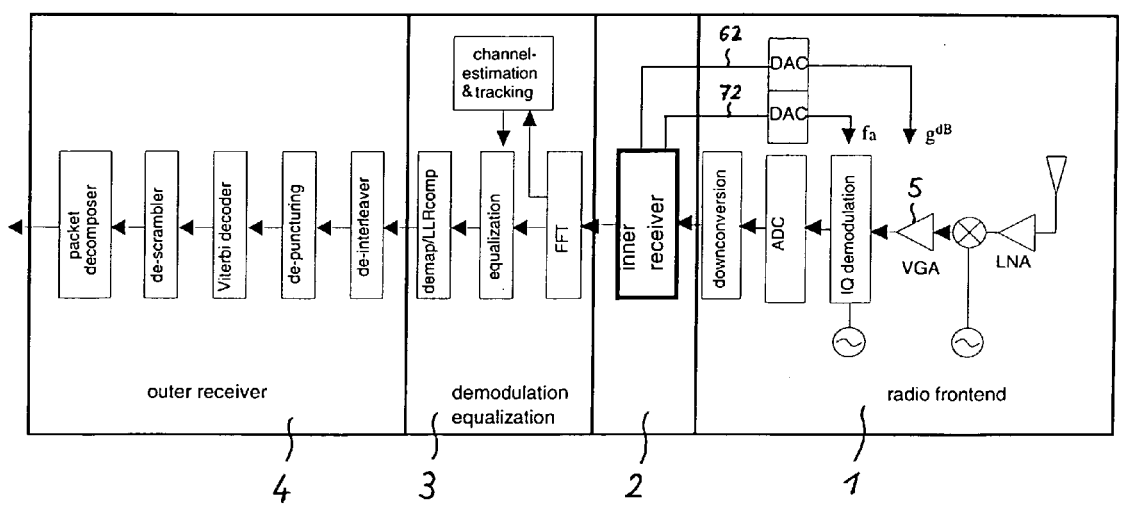
FIG. 2 shows a block diagram of an OFDM radio receiver.

FIG. 2 illustrates a block diagram of an OFDM radio receiver. It comprises a radio frontend 1, an inner receiver 2, a demodulation and equalization unit 3, and an outer receiver 4. The radio frontend 1 comprises an antenna, a low-noise amplifier, labeled with LNA, a down-converter, a variable gain amplifier 5, also labeled with and referred to VGA, an IQ demodulator, an analog-to-digital converter, also labeled with ADC, and a downconversion unit. The inner receiver 2 is described in more detail with reference to FIG. 3 below. The demodulation and equalization unit 3 comprises an FFT (Fast Fourier Transformation) unit, an equalization unit, and a demap/LLRcomp unit, whereby the FFT unit and the Equalization unit are further coupled to a channel-estimation & tracking unit. The outer receiver 4 comprises in the order from right to left a de-interleaver unit, a de-puncturing unit, a Viterbi decoder unit, a de-scambler unit, and a packet decomposer unit. The mentioned units are connected in the order as named.

A radio signal received at the antenna is amplified with the low-noise amplifier (LNA), typically down-converted to an intermediate frequency band, filtered, and scaled in amplitude by an VGA circuit. Since the dynamic range of the VGA should be at least 52 dB to satisfy the receiver sensitivity of an 802.11a radio frontend, a VGA with an exponential gain characteristic is used. A carrier signal with tunable demodulator frequency $f_a$ demodulates the VGA output signal to a baseband signal with in-phase and quadrature-phase components. The two signals are sampled with analog-to-digital converters (ADCs). In case of oversampling the analog signals, the digital samples are down sampled in the downconversion unit to a data rate 1/T and fed to the inner receiver 2.

The inner receiver 2 estimates the correct gain setting of the VGA 5, the frequency offset between the transmit and receive clock, and the OFDM symbol timing by processing the distorted, but known short and long training symbols of the preamble received prior to user data. Each short training symbol is herein also referred to as first training symbol whilst each long training symbol is also referred to as second training symbol. Based on the estimates, the inner receiver 2 controls in a closed loop the gain setting with a gain signal $g^{dB}$ to the VGA 5 and corrects the frequency offset between transmit and receive clock by feeding a corrected demodulator frequency $f_a$ to the radio frontend 1. Moreover, the inner receiver 2 extracts from the received serial stream the second frame of the preamble and all OFDM data symbols, removes the guard intervals, and forwards the resulting shortened OFDM symbols to the demodulation and equalization unit 3.

Demodulation of the subcarries of the OFDM signal is performed by using a Fast Fourier Transform (FFT) in the FFT unit. The channel-estimation & tracking unit acquires and tracks the correct phases and amplitudes of the subcarriers using, firstly, the long training symbols and, afterwards, the pilot signals embedded in each OFDM data symbol. The corresponding corrections in the received symbols are performed with a single-tap equalizer. The demodulation and equalization unit 3 and the outer receiver 4 perform all tasks to reconstruct from the equalized OFDM data symbols the most-likely transmitted binary user data packet. They comprise functions such as log-likelihood-ratio (LLR) computation, de-mapping, de-interleaving, de-puncturing, Viterbi decoding, de-scrambling, and packet de-composition.

Figure 3:
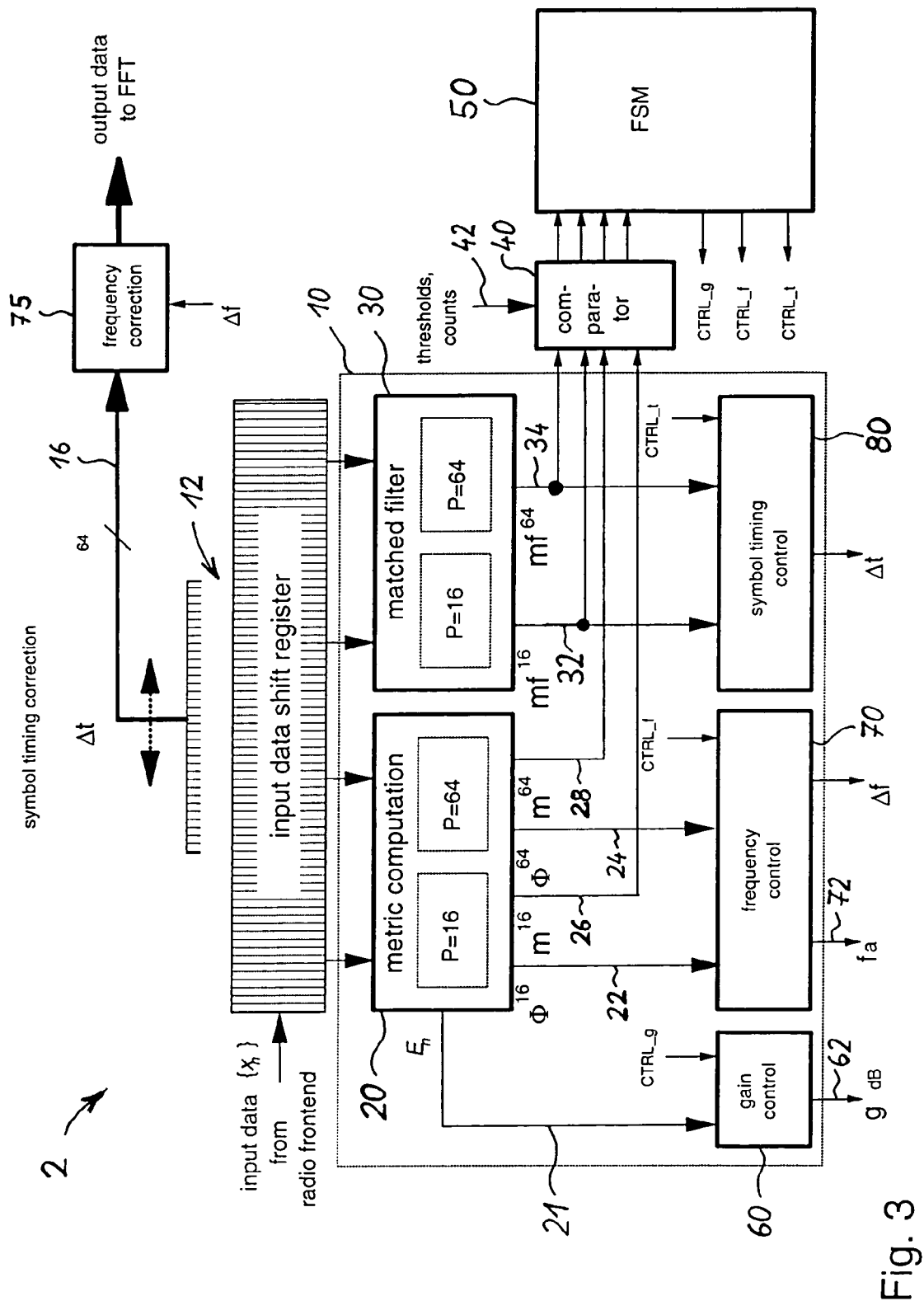
FIG. 3 shows a block diagram of an inner receiver.

FIG. 3 illustrates the inner receiver 2 in more detail. The inner receiver 2 comprises an input data shift register 12, also referred to as register, which implements a tapped delay line. The input data shift register 12 receives and temporarily stores data samples $x_n$ of a received symbol sequence $\{x_n\}$ obtained from the radio frontend 1. The inner receiver 2 further comprises a computational unit 10, a comparator 40, and a finite-state-machine 50, also abbreviated as FSM, whereby the computational unit 10 is connected via the comparator 40 to the FSM 50. As an option, the inner receiver 2 can also comprise a frequency correction unit 75, which allows compensation of clock frequency offsets with digital means. The input data shift register 12 is connected to the computational unit 10 and to the frequency correction unit 75 via line 16.

The computational unit 10 comprises a gain control unit 60, a frequency control unit 70, and a symbol timing control unit 80. The computational unit 10 further comprises a metric computation unit 20 for providing control information to the gain control unit 60, the frequency control unit 70, and the FSM 50, and comprises a matched filter unit 30 mainly used for the symbol timing control unit 80.

The FSM 50 is responsible for scheduling the various inner receiver tasks. For that the FSM 50 outputs a gain control signal CTRL_g to the gain control unit 60, a frequency control signal CTRL_f to the frequency control unit 70, and a symbol timing control signal CTRL_t to the symbol timing control unit 80. The gain control unit 60 outputs on line 62 the gain $g^{dB}$. The frequency control unit 70 outputs a demodulator frequency $f_a$ on line 72 and further outputs a frequency offset $\Delta f$. The symbol timing control unit 80 outputs a time shift $\Delta t$, also referred to as symbol timing correction $\Delta t$.

The metric computation unit 20 is connected via line 21 to the gain control unit 60 having an input for the gain control signal CTRL_g that is provided by the FSM 50. Further, the metric computation unit 20 is connected to the frequency control unit 70 via lines 22 and 24. The frequency control unit 70 has an input for the frequency control signal CTRL_f that is provided by the FSM 50. A first metric information line 26 and a second metric information line 28 are connected to the comparator 40 which is further connected to the FSM 50. Thresholds or counts can be fed to the comparator 40 via a threshold line 42. The matched filter unit 30 is connected to the symbol timing control unit 80 and the comparator 40 via a first correlation line 32 and a second correlation line 34. The symbol timing control unit 80 has an input for the symbol timing control signal CTRL_t provided by FSM 50.

Tapped Delay Line

To process the received signal with an inner receiver algorithms, digital complex data samples $x_n$ of the received symbol sequence $\{x_n\}$ are serially stored into the tapped delay line at rate 1/T=20 MHz. The tapped delay line should be long enough to store one frame of the preamble and provide sufficient time for executing the algorithms. Since the frame of the preamble is 8 µs long, the tapped delay line thus comprises at least 160 registers. The tapped delay line outputs here in parallel 64 samples via the data line 16 at a symbol clock rate of 250 kHz. The samples are selected by properly tapping 64 successive registers of the tapped delay line, and represent either received training symbols of the second frame of the preamble or received OFDM data symbols, both without guard interval. The proper tapping delay, that is the time shift $\Delta t$, is controlled by the symbol timing control unit 80.

As mentioned above, the output samples of the tapped delay line can be processed with the digital frequency correction unit 75 before being forwarded to the FFT for demodulation.

Metric Computation Unit and Frequency Control

The preamble used in 802.11a WLANs consists of ten repeatedly transmitted short training symbols of length 0.8 µs followed by two identical long training symbols of length 3.2 µs extended with a cyclic prefix as shown in FIG. 1. The first and second frame of the preamble can thus be detected by searching for the presence of periodic sequences with a periodicity of P=16 and P=64 in the received sample sequence $\{x_n\}$ stored as data samples $x_n$ in the tapped delay line.

By computing and monitoring a periodicity metric, also referred to as metric, $$m_n^P = \frac{2\left|\sum_{i=0}^{P-1} x_{n-i} x_{n-P-i}^*\right|}{\sum_{i=0}^{P-1} |x_{n-i}|^2 + \sum_{i=0}^{P-1} |x_{n-P-i}|^2}, \tag{1}$$

the inner receiver 2 can detect the presence of a periodic sequence or periodic training sequence, unaffected by transmission impairments such as amplitude and phase distortion. In eq. 1, P represents the periodicity period in sample intervals. The input data samples $x_{n-i}$, i=0, . . . , P−1, are correlated with samples that have been received P sampling intervals earlier; therefore, the nominator takes on its maximum value if the samples separated by P intervals match to each other. The denominator of the periodicity metric represents the signal energy estimate $E_n$ within a sliding window of 2P consecutively received samples. It normalizes the metric so that in the absence of noise, the metric takes on the value 1 if a periodic signal with periodicity P has been detected. If the periodic signal is longer than 2P sampling intervals, the metric stays at this plateau value until its reception ends. In a noisy environment, the plateau value is less than 1 and the metric fluctuates randomly. In order to detect a periodic signal in the presence of noise, the metric $m_n^P$ is compared to a metric threshold met_thr$^P$ in the comparator 40. The presence of a periodic signal with periodicity P is then determined from the running sum $$S_n^P = \begin{cases} \min(S_{n-1}^P + 1, S_{max}^P) & \text{if } m_n^P > \text{met\_thr}^P \\ \max(S_{n-1}^P - 1, 0) & \text{if } m_n^P \leq \text{met\_thr}^P \end{cases}. \tag{2}$$

This running sum is initialized to 0 at the time the inner receiver 2 is initialized and remains non-negative. Detection of a sample sequence with a periodicity P is indicated to the FSM 50 if $S_n^P = S_{max}^P$. End of reception of a periodic signal with periodicity P is detected if the running sum reduces from $S_n^P = S_{max}^P$ to a lower value.

Computer simulations have shown the effectiveness of the proposed method for met_thr$^P$=0.7 . . . 0.8 and $S_{max}^P$=8 for P=16 and 64.

While detecting the presence of a periodic training sequence, e.g. $S_n^P = S_{max}$, the metric computation unit 20 can provide an efficient estimate of the frequency offset $\Delta f$ between the transmit and receive clock. A frequency offset causes a phase rotation of $\phi = 2\pi\Delta f\ PT$ between the stored data samples $x_n$ of the periodic signal spaced one period P apart. As long as the metric takes on its maximum value, an estimate of the phase rotation is obtained by computing $$\phi_n^P = \angle\left(\sum_{i=0}^{P-1} x_{n-i} x_{n-P-i}^*\right). \tag{3}$$

The frequency control unit 70 derives from $\phi_n^P$ a frequency offset estimate $\Delta f$. It further reduces the error variance of the frequency offset estimate by averaging P successive phases $\phi_n^P$. The offset is corrected in the frequency correction unit 75 with digital means or by detuning the demodulator frequency $f_a$ in the radio frontend 1.

Gain Control

The gain control unit 60 derives the correct setting of the VGA gain $g_n$ by implementing an iterative, closed-loop control algorithm. Since the VGA characteristic is assumed to be exponential, successive gain values are updated according to $$g_{n+1} = g_n \cdot \Delta g_n, \quad (4)$$

if the gain $g_n^{dB} = 10 \log(g_n)$ dB is computed by $$g_{n+1}^{dB} = g_n^{dB} + \Delta g_n^{dB} \quad (5)$$

$$\Delta g_n^{dB} = f_{NL}(E_{err,n}^{dB}), \quad (6)$$

where $$E_{err,n}^{dB} = 10\log\left(\frac{E_n}{E_{tar}}\right) dB. \quad (7)$$

In eq. 6, $E_{err,n}^{dB}$ represents the signal energy error measured in dB and $f_{NL}(\cdot)$ a nonlinear function referred to as gain correction characteristic. In eq. 7, $E_n$ represents an estimate of the received signal energy and $E_{tar}$ the target signal energy. The estimate for the received signal energy $E_n$, measured with P or 2P consecutively received input samples, is provided by the metric computation unit 20. The corresponding reference value $E_{tar}$ for the gain adjustment during preamble reception is obtained by pre-calculating the nominal signal energy of the first frame of the preamble transmitted within a time interval PT.

Figure 4:
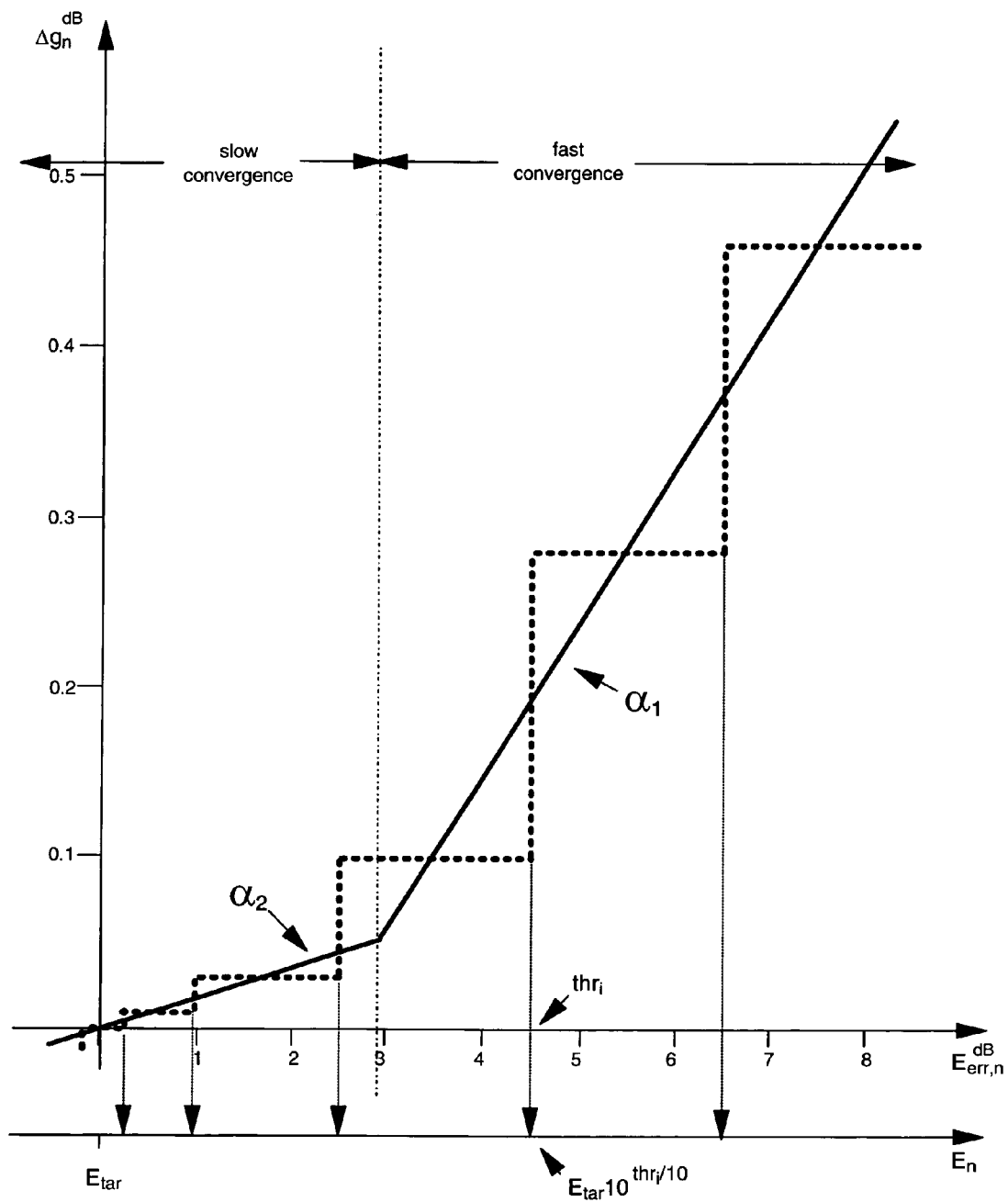
FIG. 4 illustrates a gain correction characteristic showing the gain corrections as a function of the signal energy error.

FIG. 4 illustrates a gain correction characteristic, showing the gain corrections $\Delta g_n^{dB}$ as a function of the signal energy error $E_{err,n}^{dB}$. The function has an odd symmetry $f_{NL}(-\chi) = -f_{NL}(\chi)$, so the function values for negative errors are not shown. The gain corrections $\Delta g_n^{dB}$ should be selected proportional to the signal energy error. Depending on the size of the absolute value of the error, $E_{err,n}^{dB}$ is weighted with a high gain $\alpha_1$ or low gain $\alpha_2$ in order to obtain a fast convergence from an initially falsely adjusted gain to its correct setting, or to fine adjust the gain for more closely approximating the target power $E_{tar}$, respectively.

An efficient implementation of the gain control algorithm is possible by quantizing the gain correction characteristic as indicated by the dotted line in FIG. 4. Different quantization step sizes defined by a set of thresholds $\{\pm thr_1, \pm thr_2, \ldots, \pm thr_i, \ldots\}$ and a small number of gain correction values have been selected for supporting fast gain acquisition in the fast convergence zone as well as fine adjustment if the signal energy deviates only a few dB from the target value. Based on this characteristic, proper gain corrections $\Delta g_n^{dB}$ can be selected by comparing the signal energy estimate $E_n$ to a set of pre-calculated values $$E_{tar} \cdot 10^{thr_i/10}, i=\pm 1, \pm 2, \quad (8)$$

The parameters values shown in FIG. 4 have been found with computer simulations for a particular implementation and should not limit the scope of the invention. Good control behaviour has been obtained with the gains $\alpha_1=0.042$ and $\alpha_2=0.016$, gain switching at $E_{err,n}^{dB}=\pm 3$ dB, and with 10 decision thresholds.

The gain adjustment stops if the measured signal energy is close to the target energy and the FSM 50 requests "Freeze Gain Loop". The successful convergence to the target value can be recognized by monitoring the frequency of the occurrence of zero or very small gain corrections.

Matched Filters and Symbol Timing Control

To determine the symbol timing and to confirm the reception of the short or long training sequences to the FSM 50 in the inner receiver 2, two matched filters are provided within the matched filter unit 30. Each filter correlates the received complex symbol sequence $\{x_n\}$ with a reference sequence $\{s_n\}$ or $\{l_n\}$ according to $$mf_n^{16} = \left|\sum_{i=0}^{15} x_{n-i} s_{15-i}^*\right| \quad (9)$$

$$mf_n^{64} = \left|\sum_{i=0}^{63} x_{n-i} l_{63-i}^*\right|. \quad (10)$$

The reference sequences are of length P=16 or P=64, and are obtained by determining the nominal response of an idealized channel to the transmission of a short or long training symbol, respectively. The filter defined by eq. 9 outputs a single, sharp correlation peak if 16 consecutive received input data samples match to the reference sequence derived from the short training symbol. Since the first frame of the preamble consists of 10 short training symbols, up to 10 correlation peaks can be detected while receiving the first frame. Similarly, the second matched filter outputs a correlation peak if a long training symbol has been received. Since the second frame of the preamble contains two training symbols, two correlation peaks occur.

Correlation peaks are detected by comparing the matched filter output signals $mf_n^{16}$ and $mf_n^{64}$ to matched-filter thresholds $mf\_thr^{16}$ and $mf\_thr^{64}$ in the comparator 40. Each peak detection is indicated to the FSM 50. The events $mf_n^{16} \geq mf\_thr^{16}$ confirm to the FSM 50 the reception of short training symbols. The second event of $mf_n^{64} \geq mf\_thr^{64}$ may signal to the FSM 50 that the "End of Preamble" has been detected at time n. In this case, the FSM 50 instructs the symbol timing control unit 80 to set the shift $\Delta t$ in the tapped delay line in accordance with the estimated symbol timing at time $n'=n-\Delta n$, to output the two long training symbols stored in the tapped delay line, and to start the OFDM symbol clock. $\Delta n$ compensates for signal processing delays used for executing the inner receiver algorithms.

Inner Receiver FSM

Figure 5:
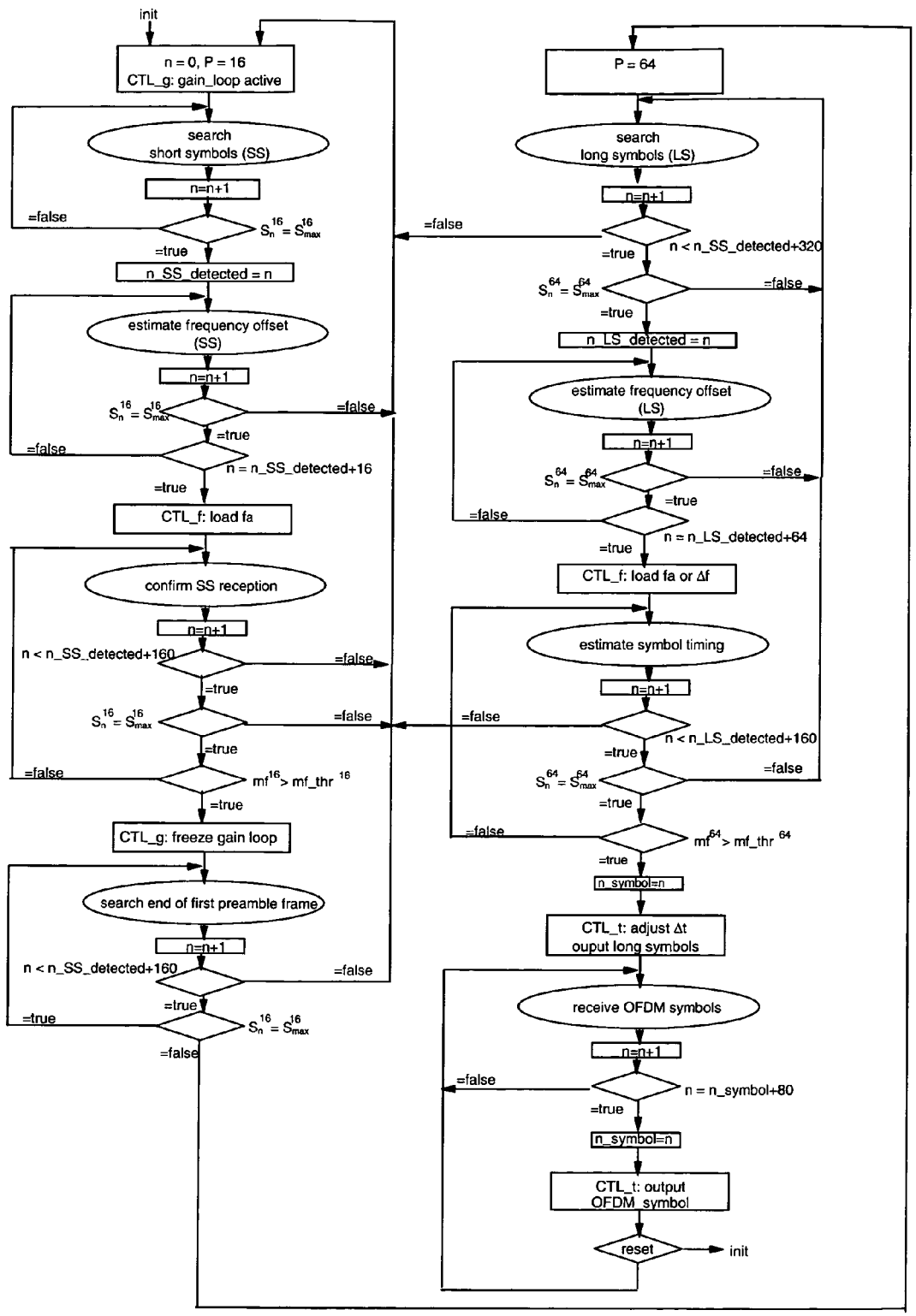
FIG. 5 shows the control flow of the inner receiver finite-state-machine which controls the start-up of the inner receiver.

FIG. 5 shows the inner receiver FSM 50, which controls the start-up of the inner receiver 2 by monitoring the output signals of the metric computation unit 20 and the matched filters of the matched filter unit 30.

The FSM 50 is initialized immediately after activating the inner receiver 2. A time index n counting receiver clock cycles is set to 0, the metric and matched filter output signals computed with periodicity P=16 are monitored, and the gain control loop is activated. The inner receiver 2 is thus ready for searching short training symbols in the received symbol sequence $\{x_n\}$ The presence of short training symbols is detected if the running sum $S_n^{16}$ (eq. 2) driven by $m_n^{16} > met\_thr^{16}$ has reached its maximum value $S_{max}^{16}$. At that time, the FSM 50 saves the current time index n, and the frequency control unit 70 starts estimating the frequency offset $$\Delta f = \frac{2\pi}{16T}\phi^{16}$$

by averaging 16 successive phase rotations $\phi_n^{16}$ (eq. 3). If the running sum $S_n^{16}$ still indicates "Short Symbol Reception" after 16 cycles, the FSM 50 commands the frequency control to download the corrected demodulator frequency value $f_a$ to the radio frontend 1 and enters the state "Confirm Short Symbol (SS) Reception".

The reception of short training symbols is confirmed by the matched filter $mf_n^{16}$ (eq. 9). If the matched filter 30 recognizes a symbol within 160 cycles after its first detection with the metric computation unit 20, the FSM 50 freezes the gain control and starts searching for "End of First Preamble Frame".

The end of the first preamble frame is detected if the running sum reduces from $S_{max}^{16}$ to a lower value because of $m_n^{16} \leq met\_thr^{16}$. At that time, the FSM 50 starts searching for long training symbols by monitoring the metric and matched filter output signals computed with periodicity P=64.

The presence of long training symbols is detected if the running sum $S_n^{64}$ (eq. 2) driven by $m_n^{64} > met\_thr^{64}$ has reached its maximum value. The maximum should be reached within 320 cycles after the first detection of a short training symbol. At that time, the FSM 50 saves the current time index n, and the frequency control unit 70 starts estimating the frequency offset $\Delta f = 2\pi/64T\phi^{64}$ by averaging 64 successive phase rotations $\phi_n^{64}$ (eq. 3). It the running $sumS_n^{64}$ still indicates "Long Symbol (LS) Reception" after 64 cycles, the FSM 50 commands the frequency control unit 70 either to download the corrected demodulator frequency value $f_a$ to the radio frontend 1, or to feed the frequency offset to the digital frequency correction unit 75. Afterwards, the FSM 50 enters the state "Estimate Symbol Timing".

The symbol timing is estimated by locating in time the end of the OFDM preamble, which is equivalent to determining the time index of the last input sample of the second long training symbol. The last sample is detected if the matched filter $m_n^{64}$ (eq. 10) of the matched filter unit 30 outputs a correlation peak and, at the same time, the running sum $S_n^{64}$ still indicates "Long Symbol Reception". At that time, the FSM 50 saves the time index n as reference value for symbol timing, instructs the symbol timing control unit 80 to set the time shift $\Delta t$ in the tapped delay line in accordance with the estimated symbol timing, and triggers the timing control to output the two long training symbols from the tapped delay line to the demodulation and equalization unit 3 via the data line 16. The FSM 50 is then ready for receiving OFDM data symbols.

In the state "Receive OFDM Symbols", the FSM 50 periodically triggers the timing control unit 80 to output data symbols after every 80 cycles. The FSM 50 is reset after completing the reception of the user data packet.

Any disclosed embodiment may be combined with one or several of the other embodiments shown and/or described. This is also possible for one or more features of the embodiments.

The present invention can be realized in hardware, software, or a combination of hardware and software. Any kind of computer system—or other apparatus adapted for carrying out the method described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A method for adjusting gain setting, receiver clock frequency, and symbol timing in an OFDM radio receiver, the method comprising the steps of:
   (i) receiving a symbol sequence ($\{x_n\}$) of data samples ($x_n$), the symbol sequence ($\{x_n\}$) comprising a preamble and user data, and the preamble comprising a first signal with a first periodicity ($P_1$) based on a repetitive transmission of a first training symbol and a second signal with a second periodicity ($P_2$) based on a repetitive transmission of a second training symbol;
   (ii) storing the data samples ($x_n$) in a register (12);
   (iii) deriving a signal energy estimate ($E_n$) from the stored data samples ($x_n$) for correcting the gain setting;
   (iv) deriving a first periodicity metric ($m_n^{P_1}$) and a second periodicity metric ($m_n^{P_2}$) from the stored data samples ($x_n$) for detecting the presence of the first signal with the first periodicity ($P_1$) and the presence of the second signal with the second periodicity ($P_2$);
   (v) deriving a first phase rotation ($\emptyset_n^{P_1}$) between the stored data samples ($x_n$) of the first signal spaced one first period ($P_1$) apart and a second phase rotation ($\emptyset_n^{P_2}$) between the received data samples ($x_n$) of the second signal spaced one second period ($P_2$) apart for determining the frequency offset between transmit and receive clock;
   (vi) detecting the reception of first training symbols, second training symbols, and the end of the second signal with the second periodicity ($P_2$) by using correlators; and
   (vii) responsive to the derivations (iv, v) and detections (vi), adjusting the gain setting, receiver clock frequency, and symbol timing under use of a finite-state-machine (50).

2. The method according to claim 1, wherein the step (iv) of deriving the first periodicity metric $m_n^P$, with P=$P_1$, and the second periodicity metric $m_n^P$, with P=$P_2$, comprises correlating the stored data samples $x_{n-i}$, with i=0, . . . , P−1, with data samples having been received P sampling intervals earlier and normalizing the result to the derived signal energy estimate ($E_n$).

3. The method according to claim 1 further comprising forwarding the first periodicity metric ($m_n^{P_1}$) and the second periodicity metric ($m_n^{P_2}$) to the finite-state-machine (50) and thereby comparing each metric ($m_n^{P_1}$, $m_n^{P_2}$) with a predefined metric threshold ($met\_{thr}^{P_1}$, $met\_{thr}^{P_2}$).

4. The method according to claim 3 further comprising feeding the signal energy estimate ($E_n$) to a gain control unit (60) and responsive to a gain control signal (CTRL_g) provided by the finite-state-machine (50) adjusting the gain in a variable gain amplifier (5) with a gain signal ($g^{dB}$).

5. The method according to claim 3 further comprising feeding the first phase rotation ($\emptyset_n^{P_1}$) and the second phase rotation ($\emptyset_n^{P_2}$) to a frequency control unit (70) and responsive to a frequency control signal (CTRL_f) provided by the finite-state-machine (50) adjusting the receiver clock frequency by detuning a demodulator frequency ($f_a$).

6. The method according to claim 5, wherein the frequency control unit (70) derives from the phases ($\emptyset_n^{P_1}, \emptyset_n^{P_2}$) a frequency offset estimate ($\Delta f$) that is usable to correct the in a frequency correction unit 75 with digital means.

7. The method according to claim 3 wherein the step (vi) of detecting comprises computing with matched filters the correlation between the stored data samples ($x_n$) and two reference sequences ($\{s_n\}, \{l_n\}$), whereby the two reference sequences ($\{s_n\}, \{l_n\}$) are obtained by determining a nominal response of an idealized channel to the transmission of the first training symbol and the second training symbol.

8. The method according to claim 7 further comprising comparing matched filter output signals ($mf_n^{P_1}, mf_n^{P_2}$) to matched-filter thresholds ($mf\_thr_n^{P_1}, mf\_thr_n^{P_2}$) to indicate correlation peaks to the finite-state-machine (50) in case of receiving first training symbols, second training symbols, and the end of the preamble.

9. The method according to claim 8 further comprising feeding the matched filter output signals ($mf_n^{P_1}, mf_n^{P_2}$) to a symbol timing control unit (80) and responsive to a symbol control signal (CTRL_t) provided by the state machine (50) adjusting the symbol timing with a symbol timing correction signal ($\Delta t$).

10. A computer program product stored on a computer usable medium, comprising computer readable program means for causing a computer to perform:
  (i) receiving a symbol sequence ($\{x_n\}$) of data samples ($x_n$), the symbol sequence ($\{x_n\}$) comprising a preamble and user data, and the preamble comprising a first signal with a first periodicity ($P_1$) based on a repetitive transmission of a first training symbol and a second signal with a second periodicity ($P_2$) based on a repetitive transmission of a second training symbol;
  (ii) storing the data samples ($x_n$) in a register (12);
  (iii) deriving a signal energy estimate ($E_n$) from the stored data samples ($x_n$) for correcting the gain setting;
  (iv) deriving a first periodicity metric ($m_n^{P_1}$) and a second periodicity metric ($m_n^{P_2}$) from the stored data samples ($x_n$) for detecting the presence of the first signal with the first periodicity ($P_1$) and the presence of the second signal with the second periodicity ($P_2$);
  (v) deriving a first phase rotation ($\emptyset_n^{P_1}$) between the stored data samples ($x_n$) of the first signal spaced one first period ($P_1$) apart and a second phase rotation ($\emptyset_n^{P_2}$) between the received data samples ($x_n$) of the second signal spaced one second period ($P_2$) apart for determining the frequency offset between transmit and receive clock;
  (vi) detecting the reception of first training symbols, second training symbols, and the end of the second signal with the second periodicity ($P_2$) by using correlators; and
  (vii) responsive to the derivations (iv, v) and detections (vi), adjusting the gain setting, receiver clock frequency, and symbol timing under use of a finite-state-machine (50).

11. The computer program product of claim 10, wherein the step (iv) of deriving the first periodicity metric $m_n^P$, with $P=P_1$, and the second periodicity metric $m_n^P$, with $P=P_2$, comprises a step of correlating the stored data samples $x_{n-i}$, with $i=0, \ldots, P-1$, with data samples having been received P sampling intervals earlier and normalizing the result to the derived signal energy estimate ($E_n$).

12. The computer program product of claim 10, further comprising computer readable program means for causing the computer to perform a step of forwarding the first periodicity metric ($m_n^{P_1}$) and the second periodicity metric ($m_n^{P_2}$) to the finite-state-machine (50) and thereby comparing each metric ($m_n^{P_1}, m_n^{P_2}$) with a predefined metric threshold (met_thr$^{P_1}$, met_thr$^{P_2}$).

13. The computer program product of claim 12, further comprising computer readable program means for causing the computer to perform a step of feeding the signal energy estimate ($E_n$) to a gain control unit (60) and responsive to a gain control signal (CTRL_g) provided by the finite-state-machine (50) adjusting the gain in a variable gain amplifier (5) with a gain signal ($g_{dB}$).

14. The computer program product of claim 12, further comprising computer readable program means for causing the computer to perform a step of feeding the first phase rotation ($\emptyset_n^{P_1}$) and the second phase rotation ($\emptyset_n^{P_2}$) to a frequency control unit (70) and responsive to a frequency control signal (CTRL_f) provided by the finite-state-machine (50) adjusting the receiver clock frequency by detuning a demodulator frequency ($f_a$).

15. The computer program product of claim 12, wherein the step (vi) of detecting comprises computing with matched filters the correlation between the stored data samples ($x_n$) and two reference sequences ($\{s_n\}, \{l_n\}$), whereby the two reference sequences ($\{s_n\}), \{l_n\}$) are obtained by determining a nominal response of an idealized channel to the transmission of the first training symbol and the second training symbol.

16. The computer program product of claim 15, further comprising computer readable program means for causing the computer to perform a step of comparing matched filter output signals ($mf_n^{P_1}, mf_n^{P_2}$) to matched-filter thresholds ($mf\_thr_n^{P_1}, mf\_thr_n^{P_2}$) to indicate correlation peaks to the finite-state-machine (50) in case of receiving first training symbols, second training symbols, and the end of the preamble.

17. An apparatus (2) for adjusting gain setting, receiver clock frequency, and symbol timing in a receiver, the apparatus comprising:
  receiving means for receiving a symbol sequence ($\{x_n\}$) of data samples ($x_1$) from an RF (radio frequency) front end of a receiver;
  a register (12) for storing the data samples ($x_n$), the register (12) having a size to store at least data samples ($x_n$) of a first periodic signal in the received symbol sequence with a first periodicity ($P_1$) and a second periodic signal in the received symbol sequence with a second periodicity ($P_2$);
  a computational unit (10) that uses the stored data samples ($x_n$) of the first and second periodic signals for computing a signal energy estimate ($E_n$), periodicity metrics ($m_n^{P_1}, m_n^{P_2}$) ($x_n$) and matched filter output signals ($mf_n^{P_1}, mf_n^{P_2}$); and
  a finite-state-machine (50) which generates control signals based on the periodicity metrics and matched filter signals output from the computational unit for controlling the computational unit to output adjustment control signals to adjust a gain setting of a variable gain amplifier in the receiver front end based on the signal energy estimate ($E_n$) and to adjust a receiver clock frequency, and a symbol timing of the receiver.

18. The apparatus according to claim 17, wherein the computational unit (10) comprises a metric computation unit (20) for computing the signal energy estimate ($E_n$) and periodicity metrics ($m_n^{P_1}$, $m_n^{P_2}$) and a matched filter unit (30) for computing the matched filter output signals ($mf_n^{P_1}$, $mf_n^{P_2}$), wherein the metric computation unit and matched filter unit are connected to the finite-state-machine (50) via a comparator (40).

19. The apparatus according to claim 17, wherein the computational unit (10) comprises:

a gain control unit (60) receiving as input the signal energy estimate ($E_n$) from the metric computation unit (20), a frequency control unit (70) receiving as input the periodicity metrics from the metric computation unit (20), and a symbol timing control unit (80) receiving as input the matched filter output signals from the matched filter unit (30), wherein the gain control, frequency control and symbol timing control units output adjustment control signals in response to the control signals output from the finite state machine.

20. An OFDM receiver comprising an apparatus (2) according to claim 17.

* * * * *